(12) United States Patent
Koike

(10) Patent No.: US 7,853,623 B2
(45) Date of Patent: Dec. 14, 2010

(54) DATA MINING SYSTEM, DATA MINING METHOD AND DATA RETRIEVAL SYSTEM

(75) Inventor: Asako Koike, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 392 days.

(21) Appl. No.: 12/000,841

(22) Filed: Dec. 18, 2007

(65) Prior Publication Data

US 2008/0147622 A1    Jun. 19, 2008

(30) Foreign Application Priority Data

Dec. 18, 2006   (JP)   ............................... 2006-339566

(51) Int. Cl.
*G06F 17/30* (2006.01)
(52) U.S. Cl. ...................... 707/803; 707/752
(58) Field of Classification Search ................. 707/655, 707/706, 752, 803; 702/19; 345/440
See application file for complete search history.

(56) References Cited

U.S. PATENT DOCUMENTS

| | | | | |
|---|---|---|---|---|
| 5,307,266 | A * | 4/1994 | Hayashi et al. | 715/201 |
| 5,450,535 | A * | 9/1995 | North | 345/440 |
| 5,940,824 | A * | 8/1999 | Takahashi | 707/999.006 |
| 6,076,088 | A * | 6/2000 | Paik et al. | 707/999.005 |
| 6,353,840 | B2 * | 3/2002 | Saito et al. | 715/202 |
| 6,876,930 | B2 * | 4/2005 | Murray et al. | 702/19 |
| 6,941,317 | B1 * | 9/2005 | Chamberlin et al. | 707/803 |
| 7,346,490 | B2 * | 3/2008 | Fass et al. | 704/7 |
| 7,627,588 | B1 * | 12/2009 | Mohan et al. | 707/802 |
| 2002/0091678 | A1 * | 7/2002 | Miller et al. | 707/706 |
| 2005/0240583 | A1 * | 10/2005 | Li et al. | 707/752 |
| 2006/0053175 | A1 * | 3/2006 | Gardner et al. | 707/655 |

FOREIGN PATENT DOCUMENTS

| | | |
|---|---|---|
| JP | 09-185674 | 12/1995 |
| JP | 2003-178263 | 12/2001 |

OTHER PUBLICATIONS

Toni Hisamitsu et al., "Information Extraction from Parenthetical Expressions by Using Statistical Measures and Simple Rules", Advanced Research laboratory, Hitachi, Ltd., Nov. 21, 1997, pp. 113-118.

* cited by examiner

*Primary Examiner*—Shahid A Alam
(74) *Attorney, Agent, or Firm*—Stites & Harbison, PLLC; Juan Carlos A. Marquez, Esq

(57) ABSTRACT

Accurate concept information and relationships between concepts are extracted from a figure even in a case where sufficient character string recognition accuracy cannot be obtained by image processing, or a case where lexical ambiguity remains because there are a plurality of meanings with the same spelling. After concepts and relationships between concepts appearing in a document referring to a figure and a document related or similar to the document are prepared, candidates for concepts and relationships between concepts are limited to those likely to appear in the figure by checking against the prepared concepts and relationships between concepts. Thus, a false recognition rate is lowered.

19 Claims, 17 Drawing Sheets

INPUT SCREEN

OUTPUT SCREEN

FIG. 6A

| ID-1 | ID-2 | Relationship-ID | Occurrence frequencies |
|---|---|---|---|
| F000001 | HS00002 | Type-1 | 25 |
| HS00003 | HS00001 | Type-5 | 20 |
| F000004 | F000006 | Type-1 | 85 |
| HS00004 | F000006 | Type-2 | 80 |
| F000002 | HS00004 | Type-2 | 20 |
| HS00004 | C000001 | Type-3 | 15 |
| HS00005 | F000003 | Type-5 | 10 |
| F000005 | HS00009 | Type-1 | 15 |
| F000006 | F000003 | Type-1 | 75 |
| .... | .... | .... | .... |

FIG. 6B

| CONCEPT ID | NAME TYPE | NAME |
|---|---|---|
| ... | ... | ... |
| HS00001 | Symbol | JUN |
| HS00001 | Full name | v-jun sarcoma virus 17 oncogene homolog (avian) |
| HS00001 | Synonym | cJUN |
| HS00002 | Symbol | DAG |
| HS00002 | Full name | Diacylglycerol |
| ... | ... | ... |
| F000004 | Symbol | Ras |
| F000004 | Full Name | Harvey rat sarcoma viral oncogene homolog |
| F000005 | | MEK |
| F000005 | | Mitogen activated kinase kinase |
| F000006 | | MAP2K |
| F000006 | Symbol | Raf |
| F000006 | Full Name | Raf murine leukemia viral oncogene homolog |
| F000007 | Symbol | PKC |
| F000007 | Full Name | Protein kinase C |
| ... | ... | ... |

| Relationship-ID | Type of relationship |
|---|---|
| Type-1 | activate |
| Type-2 | Probable activate |
| Type-3 | Inhibit |
| Type-4 | Probable inhibit |
| Type-5 | Complex |

FIG. 7A

| Concept 1 | ID-1 | Concept 2 | ID-2 | Relationship-ID | Figure number |
|---|---|---|---|---|---|
| PLC-b | F000002 | PKC | F000007 | Type-1 | 1 |
| PKC | F000007 | Raf | F000006 | Type-2 | 1 |
| PKC | F000007 | apoptosis | C000001 | Type-3 | 1 |
| GRB2 | HS00004 | mSOS | F000003 | Type-5 | 1 |
| GRB2 | HS00004 | Ras | F000004 | Type-1 | 1 |
| Ras | F000004 | Raf | F000006 | Type-1 | 1 |
| Raf | F000006 | MEK | F000005 | Type-1 | 1 |
| MEK | F000005 | ERK1/2 | HS00009 | Type-1 | 1 |

FIG. 7B

| Concept | ID | Figure number |
|---|---|---|
| PLC-b | F000002 | 1 |
| PKC | F000007 | 1 |
| apoptosis | C000001 | 1 |
| GRB2 | HS00004 | 1 |
| mSOS | F000003 | 1 |
| Ras | F000004 | 1 |
| Raf | F000006 | 1 |
| ERK1/2 | HS00009 | 1 |
| MEK | F000005 | 1 |

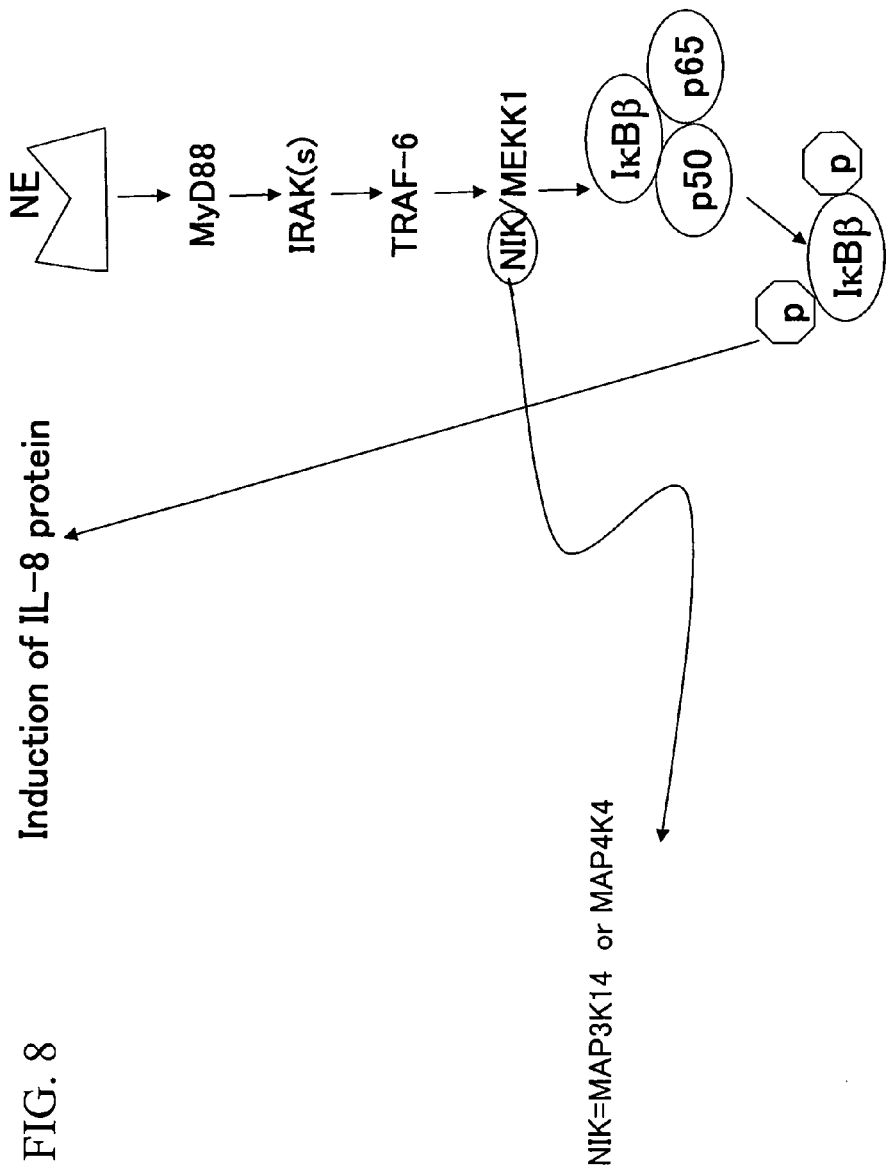

FIG. 8

Figure Legend: Schematic drawing of NE-induced IL-8 signal transduction pathway in bronchial epithelial human cells. NE activates an receptor and this leads to the activation of MyD88, which is an adaptor to the receptor complex of IRAK. This signaling induces the susequent activation of Traf6 to IkBb via NIK:NFκB-inducing kinase /MEKK1:mitogen activated protein kinase kinase 1, I......

FIG. 9A

| Concept 1 | ID-1 | Concept 2 | ID-2 | Relationship-ID | Figure number |
|---|---|---|---|---|---|
| NIK | HS0011 | IKK | HS0012 | Type-1 | 2 |
| NIK | HS0011 | MEKK1 | HS0013 | Type-5 | 2 |
| MEKK1 | HS0013 | IKK | HS0012 | Type-1 | 2 |
| TRAF-6 | HS0014 | NIK | HS0011 | Type-1 | 2 |
| ... | | | | | ... |

FIG. 9B

| Concept | ID | Figure number |
|---|---|---|
| NIK | HS0011 | 2 |
| IKK | HS0012 | 2 |
| MEKK1 | HS0013 | 2 |
| T-RAF | HS0014 | 2 |
| ... | | ... |

FIG. 9C

| Relationship-ID | Type of relationship |
|---|---|
| Type-1 | activate |
| Type-2 | Probable activate |
| Type-3 | Inhibit |
| Type-4 | Probable inhibit |
| Type-5 | Complex |

FIG. 9D

| Concept ID | Name type | Name |
|---|---|---|
| HS00011 | Symbol | MAP3K14 |
| HS00011 | Full name | mitogen-activated protein kinase kinase kinase 14 |
| HS00011 | Synonym | NFκB-inducing kinase |
| HS00011 | Synonym | NIK |
| HS00002 | Synonym | nuclear factor kappa B-inducing kinase |
| ... | | ... |

MAIN TEXT:⟨Introduction⟩ ....The receptors are known as the integrins: heterodimers composed of α and β subunits
Figure Legend: Schematic drawing of the ERK and PKB signaling
pathways in response to integrin stimulation. The ERK and PKB signaling pathways are related to the cell survival.

FIG. 11A

| Concept 1 | ID-1 | Concept 2 | ID-2 | Relationship-ID | Figure number |
|---|---|---|---|---|---|
| Integrin alpha | F000011 | Integrin beta | F000012 | Type-5 | 3 |
| Integrin beta | F000012 | FAK | HS0111 | Type-5 | 3 |
| FAK | HS0111 | Fyn | HS0112 | Type-1 | 3 |
| ... | | | | | ... |

FIG. 11B

| Concept | ID | Figure number |
|---|---|---|
| Integrin alpha | F000011 | 3 |
| Integrin beta | F000012 | 3 |
| FAK | HS0111 | 3 |
| ... | | ... |

FIG. 11C

| Relationship-ID | Type of relationship |
|---|---|
| Type-1 | activate |
| Type-2 | Probable activate |
| Type-3 | Inhibit |
| Type-4 | Probable inhibit |
| Type-5 | Complex |

FIG. 11D

| Concept ID | Name type | Name |
|---|---|---|
| F000011 | Symbol | ITGA |
| F000011 | Full name | Integrin alpha |
| F000011 | Synonym | VERY LATE ACTIVATION PROTEIN |
| F000011 | Synonym | VLA |
| ... | | |

FIG. 13A

| Concept | ID | Figure number |
|---|---|---|
| A | F000002 | F1 |
| A | F000002 | F3 |
| A | F000002 | F2 |
| A | F000002 | F4 |
| A | F000002 | F6 |
| B | F000007 | F1 |
| B | F000007 | F3 |
| B | F000007 | F4 |
| C | C000001 | F1 |
| C | C000001 | F2 |
| C | C000001 | F4 |
| D | HS00004 | F1 |
| D | HS00004 | F3 |
| D | HS00004 | F2 |
| E | F000003 | F1 |
| E | F000003 | F3 |
| E | F000003 | F2 |
| E | F000003 | F4 |

| Concept | ID | Figure number |
|---|---|---|
| F | F000012 | F5 |
| G | HS00008 | F5 |
| G | HS00008 | F6 |
| I | HS00011 | F1 |
| I | HS00011 | F5 |
| J | HS00012 | F6 |
| J | HS00012 | F6 |
| K | HS00015 | F3 |
| K | HS00015 | F9 |
| K | HS00015 | F4 |
| ... | ... | ... |

FIG. 13B

| Figure number | Position in document | Figure name |
|---|---|---|
| F1 | L1-1 | XXXX pathway |
| F2 | L1-2 | XXXZ pathway |
| F3 | L2-3 | XXXY pathway |
| F4 | L2-4 | XXXA pathway |
| F5 | L2-1 | XXXB pathway |
| F6 | L2-2 | XXXC pathway |
| ... | ... | ... |

FIG. 15B

| Figure number | Position in document | Figure name |
|---|---|---|
| G1 | LL1-1 | GXC pathway |
| G2 | LL1-2 | GXD pathway |
| G3 | LL2-3 | GXA pathway |
| G4 | LL2-4 | GXB pathway |

FIG. 15A

| Concept | ID | Figure number | Appearance location |
|---|---|---|---|
| AA | G0001 | G1 | p |
| AA | G0001 | G3 | f |
| AA | G0001 | G4 | f |
| BB | G0002 | G3 | f |
| BB | G0002 | G4 | f |
| CC | G0003 | G1 | f |
| CC | G0003 | G3 | f |
| DD | G0004 | G1 | t |
| DD | G0004 | G3 | p |
| DD | G0004 | G4 | t |
| EE | G0005 | G1 | t |
| EE | G0005 | G3 | p |
| EE | G0005 | G4 | t |
| FF | G0006 | G2 | f |
| GG | G0007 | G2 | t |

DATA MINING SYSTEM, DATA MINING METHOD AND DATA RETRIEVAL SYSTEM

CLAIM OF PRIORITY

The present application claims priority from Japanese application JP 2006-339566 filed on Dec. 18, 2006, the content of which is hereby incorporated by reference into this application.

BACKGROUND OF THE INVENTION

1. Field of the Invention

The present invention relates to a system and a method for extracting information from a figure in a document by use of an image processing technique and text information in the document, and for utilizing the extracted information for figure retrieval and document retrieval.

2. Description of the Related Art

In many cases, only a text portion is targeted for information extraction from a document containing figures. Even in the case of information extraction from a figure, a target thereof is limited to semi-structured or structured data, such as a table. There are various methods concerning recognition of characters in the figure, including those disclosed in Japanese Patent Application Laid-Open Publications Nos. 2003-178263 and Hei 9 (1997)-185674. Basically, the figure is binarized, if necessary, to extract connected components. Thereafter, character portions are distinguished from other symbol portions by use of characteristics of the connected components. Thus, word recognition of the character portions is performed.

SUMMARY OF THE INVENTION

In a conventional case, for extraction of information from a figure, only figure information is utilized or a thesaurus and a dictionary are supplementarily utilized in the word recognition procedure, and information in a main text having a figure represented therein is not utilized. Moreover, although information obtained by analyzing the figure may be utilized as a result of analysis of the figure, the analysis result made to be treated the same as concepts in the document is hardly utilized to enhance accuracy of document retrieval or figure retrieval.

Character information, concept information and relationships between concepts (relationships such as a concept A "activates", "regulates" and "controls" a concept B) are extracted from a figure by employing a method for enhancing accuracy of character string recognition, i.e., image processing itself, and also by using a thesaurus or a dictionary in converting recognized character strings into concepts. However, in the cases such as where the character string is short, where sufficient accuracy of character string recognition cannot be obtained, and where lexical ambiguity remains because a plurality of meanings are obtained with the same spelling, sufficient accuracy cannot be often obtained with the conventional method for extracting concept information and a relationship between concepts by removing the lexical ambiguity only by image processing of the figure. For this reason, a content of a figure cannot be treated the same as text information of the document, and retrieval of the figure and retrieval of the main text by use of the figure cannot be sufficiently performed. Moreover, since the figure and the main text are analyzed separately in the conventional method, it is impossible to extract a relationship between a leading concept representing an entire figure, such as a title, and concepts described in the figure and relationships between the concepts. In many cases, the relationship between the leading concept representing the entire figure and the content of the figure is not described in the document, and accordingly extraction of this information is hardly executed in the conventional case.

In the present invention, when concepts and relationships between concepts are extracted from a figure in a document by performing image processing, the document having the figure described therein and a related document are utilized. To be more specific, prepared are concepts and relationships between concepts appearing in: the document having the figure described therein; a document similar to this document; or a document related to this document. Otherwise, concepts and relationships between concepts weighted according to importance thereof are prepared. Thereafter, the prepared concepts and relationships between concepts are checked against a concept in the figure that cannot be specified due to insufficient accuracy of the image processing, and against a concept and a relationship between concepts having lexical ambiguity. Accordingly, candidates of concepts and relationships between concepts are limited to those likely to appear in the figure, so that a false recognition rate is lowered. In this event, the remaining candidates of concepts or relationships between concepts may be narrowed down by actively utilizing concepts or relationships between concepts which can be accurately recognized.

Moreover, in this event, a user may accordingly change parameters in each step for each target document or each document group. Furthermore, the title representing the leading concept of the content of the figure or concepts in a figure caption are associated with the extracted content of the figure. Thus, a relationship between the content of the figure and the leading concept, which is not described in the main text in many cases, can be extracted. Furthermore, in order to enable a figure analysis result to be retrieved in the same manner as a document, the figure analysis result may be converted into indices, as in the case of the document, to perform figure retrieval and document retrieval or similar document retrieval for a document containing figures.

A text mining system according to the present invention has the following configuration. Specifically, the text mining system includes: preprocessing means for associating a figure with information referring to the figure in a main text, extracting concepts and relationships between concepts described in a document referring to the figure and a document related thereto after retrieval and extraction thereof and performing weighting according to importance thereof if necessary; image processing means for executing binarization of the figure, extraction of connected components and extraction of character strings; means for recognizing the concepts and removing lexical ambiguity by using information about concepts and relationships between concepts prepared by preprocessing for the extracted character strings and various external dictionaries and thesauruses; means for extracting a relationship between the recognized concepts; means for extracting a relationship of the recognized concepts and relationships between concepts with concepts in a figure title or a figure caption to be a leading concept thereof; means for inputting parameters for processing in each step; and means for displaying the extracted information in a feasible order. The text mining system may further include: means for retrieving a document so as to enable retrieval of a figure or retrieval of a document or a similar document including a figure on the basis of an analysis result; a part which inputs retrieval conditions; and means for displaying a retrieval result.

According to the present invention, by inputting, by document containing a figure and a related document to this system by a user, recognition of concepts in the figure and relationships between concepts are extracted and represented. Even if the figure has insufficient resolution and recognition of the concepts is not sufficiently performed by the conventional image processing technique, a possibility of concepts that may appear in the figure is narrowed by utilizing a main text of the figure and a document related or similar to the main text. Thus, original concepts can be recognized. Moreover, even if the concept has a plurality of meanings, in other words, lexical ambiguity, the ambiguity can be eliminated by utilizing the main text and the related document. Moreover, even if the figure has insufficient resolution also in the relationship between the concepts in the figure, a possibility of relationships that may appear in the figure is narrowed by utilizing the main text of the related document. Thus, original concepts can be accurately recognized. Moreover, by associating the concepts appearing in the figure title and the figure caption with the concepts in the figure and the relationships between concepts, a relationship between a leading concept representing the figure itself and information in the figure, which is not described in the main text or in the figure, can be extracted. Furthermore, the result of analysis of the figure can be treated the same as the document information. Thus, it is made possible to execute more accurate retrieval of figures and documents as well as retrieval of a relationship between the leading concept and a phenomenon represented by the concept.

BRIEF DESCRIPTION OF THE DRAWINGS

FIG. 6A is a table showing relationships between concepts.

FIG. 6B is a table showing relationships between concept IDs and concepts.

FIGS. 7A and 7B are tables showing an example of an analysis result of a figure: FIG. 7A is a table showing relationships between concepts and FIG. 7B is a table showing relationships between figure numbers and concepts appearing in the figures.

FIG. 8 is a view showing an example of a figure to be analyzed.

FIGS. 9A to 9D are tables showing a result of analysis in FIG. 8: FIG. 9A is a table showing relationships between concepts, FIG. 9B is a table showing relationships between concept IDs and concepts, FIG. 9C is a table showing types of the relationships between concepts and FIG. 9D is a table showing a part of a thesaurus utilized.

FIG. 11A is a table showing relationships between concepts, FIG. 11B is a table showing relationships between concept IDs and concepts, FIG. 11C is a table showing types of the relationships between concepts and FIG. 11D is a table showing a part of a thesaurus utilized.

FIGS. 13A and 13B are tables showing a data structure used for retrieval.

FIGS. 15A and 15B are tables showing a data structure used for retrieval.

DETAILED DESCRIPTION OF THE PREFERRED EMBODIMENTS

Hereinafter, a detailed description will be given of an embodiment of information extraction from a document containing figures, according to the present invention. However, the present invention is not limited to the following embodiment.

Figure 1:
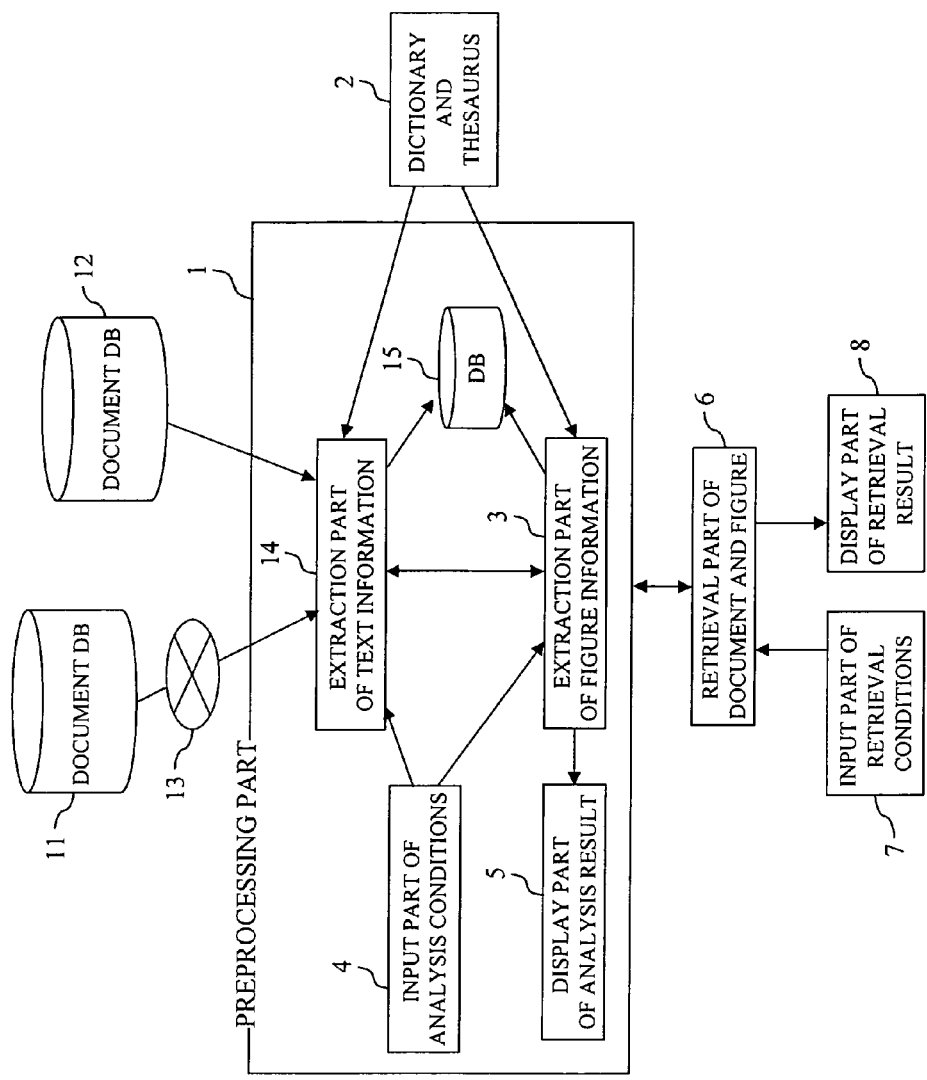
FIG. 1 is a view showing a system configuration example of a mining system for texts containing figures, according to the present invention.

FIG. 1 is a view showing a system configuration example of a mining system for texts containing figures, according to the present invention. A text containing figures means an HTML text having figures embedded therein, such as those open to public on the Web, a document having figures and texts in pairs, a PDF document containing figures (except those in which text portions are images) and the like. Details on an extraction part of text information 14 in FIG. 1 will be shown in FIG. 2. An example of a flow of analysis according to the present invention will be shown in FIG. 3.

Figure 2:
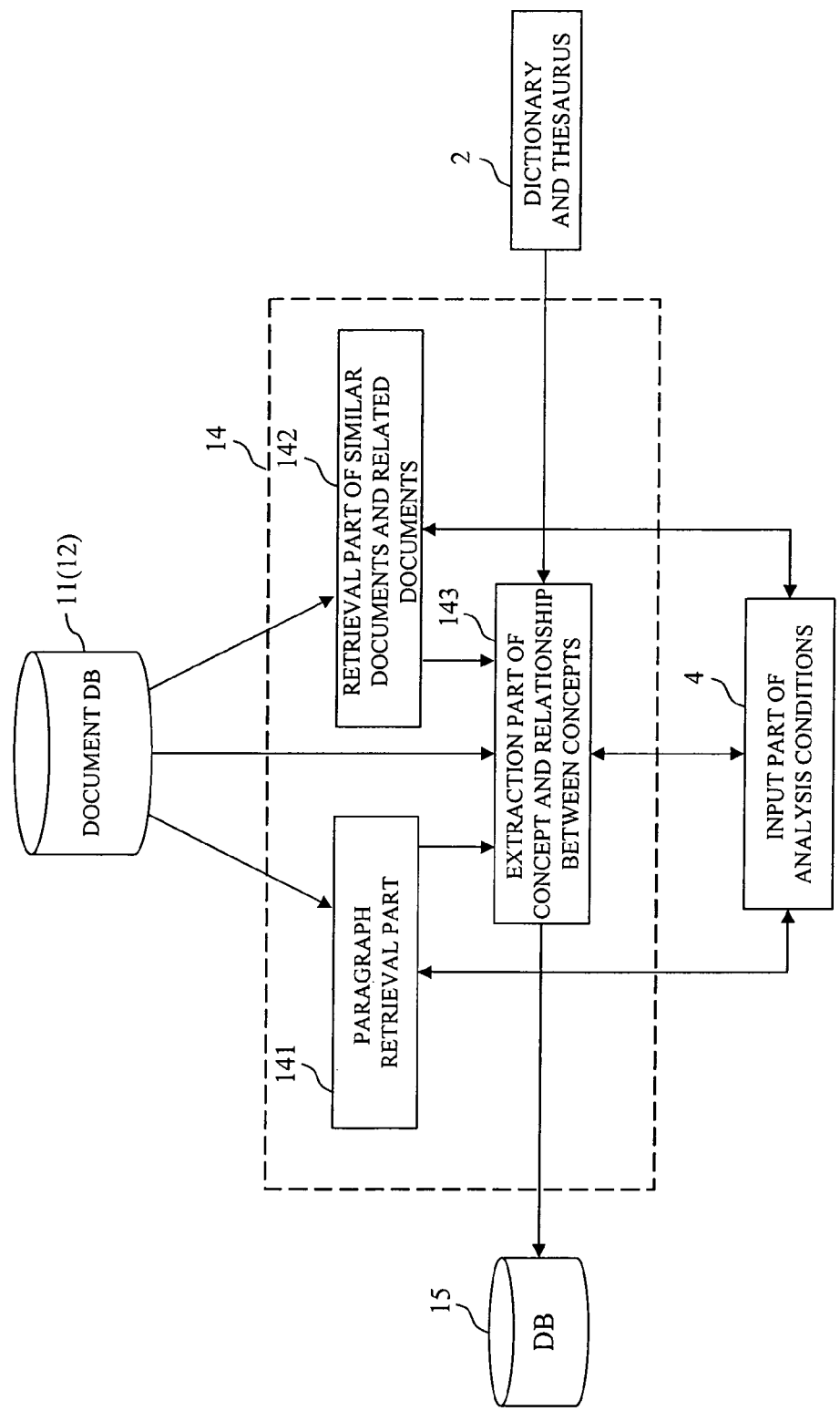
FIG. 2 is a detail view showing a preprocessing part.

The mining system according to the present invention includes: a preprocessing part 1 which extracts information from a document containing a figure; an input part of retrieval conditions 7 which inputs retrieval conditions; a retrieval part of document and FIG. 6 which executes retrieval of documents containing figures; and a display part 8 which displays a retrieval result. The preprocessing part 1 includes: the extraction part of text information 14; an extraction part of figure information 3; an input part of analysis conditions 4 which inputs analysis conditions to the respective extraction parts 3 and 14; a display part of analysis result 5 which displays an analysis result; and an analysis result storage database 15 which stores the extracted information. The extraction part of text information 14 extracts concepts and relationships between concepts from the entire main text of the document or from information on documents similar or related to the document referring to the figure in the main text, and also performs weighting processing for the extracted concepts and relationships between concepts. As shown in FIG. 2, the extraction part of text information 14 includes a paragraph retrieval part 141, a retrieval part of similar documents and related documents 142 and an extraction part of concept and relationship between concepts 143. The above processing will be described in detail later. The input part of analysis conditions 4 inputs, for example, the fact of whether or not to utilize the related documents or similar documents, a threshold for character recognition, and the like.

Figure 3:
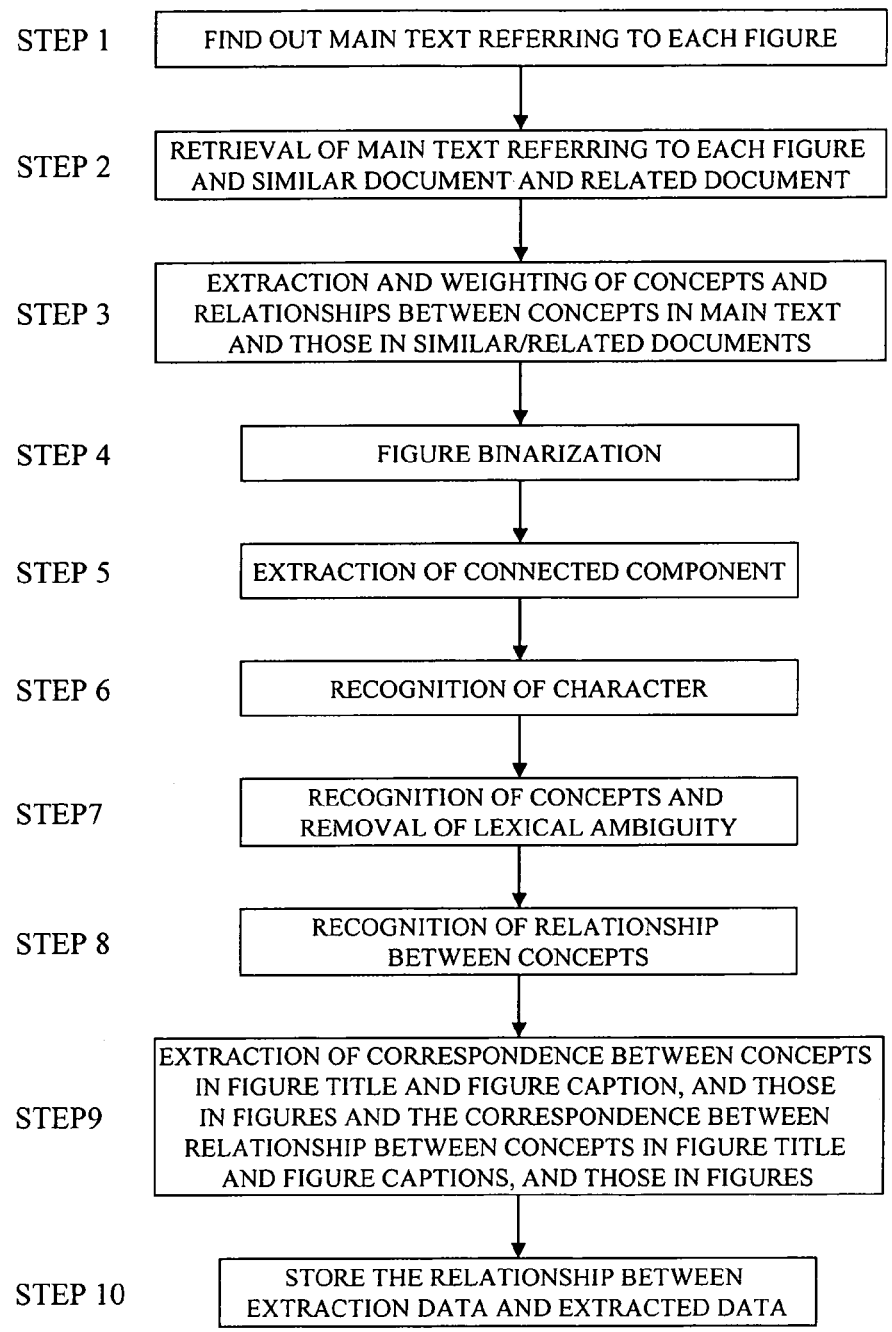
FIG. 3 is a flowchart showing a flow of analysis according to the present invention.

In the preprocessing part 1, as to a document containing a figure, which is obtained from a document database 12 connected to the preprocessing part 1 or from an external document database 11 connected thereto via the Internet 13, a paragraph group in a main text and the entire main text which are referring to the figure, and related documents are retrieved (Steps 1 and 2 in FIG. 3). Thereafter, appearing concepts and relationships between concepts are extracted and weighting thereof is performed by comparing the concepts to those in other unrelated documents as to whether or not the concepts appear characteristically (Step 3). The processing of Step 1 is executed by the paragraph retrieval part 141 and the processing of Step 2 is executed by the retrieval part of similar documents and related documents 142. Moreover, the processing of Step 3 is executed by the extraction part of concept and relationship between concepts 143.

As a statistical method for the weighting, there are various techniques such as TF-IDF (tf(q|D)*log(N/doc(q), in which tf(q|D) indicates the number of appearances of a concept q in a target document (or document group) D, df(q) indicates the number of documents containing the concept q, and N indicates the total number of documents), Lnu-term weighting (Singhal et al. Proc. 19$^{th}$ ACM SIGIR, 21-29, 1996.) and HyperGsum (Hisamitsu, Niwa, Natural Language Processing, Vol. 142 85-90, 2000). However, the present invention is not limited to those described above. Moreover, for the weighting, a distance such as a shortest distance as a word (assuming the word is a unit of distance) from the main text referring to the figure may be used. Such a range of the main text and concept weighting conditions to be used as well as thresholds for character recognition and concept recognition in a figure analysis are set by the input part of analysis conditions 4.

To be more specific, as shown in FIG. 2, a paragraph in the main text referring to the figure is retrieved by the paragraph retrieval part 141 using the conditions from the input part of analysis conditions 4. The paragraph retrieval part 141 retrieves and extracts a paragraph explaining the figure. The extraction part of concept and relationship between concepts 143 extracts concepts from a title and a legend of the figure based on the information from the paragraph retrieval part 141. Moreover, the extraction part of concept and relationship between concepts 143 extracts concepts and relationships between concepts in the paragraph retrieved by the paragraph retrieval part 141 and performs weighting thereof. Furthermore, the extraction part of concept and relationship between concepts 143 extracts concepts and relationships between concepts from the entire main text of the document obtained from the document database 11 (12) and performs weighting thereof. The retrieval part of similar documents and related documents 142 retrieves similar documents and related documents by searching through the document databases 11 and 12. Here, a similar document mainly means a document in which kinds and frequencies of concepts are similar to those of the concepts used in a certain document. Moreover, a related document mainly means a document referred to by a certain document. The extraction part of concept and relationship between concepts 143 further extracts concepts and relationships between concepts from the documents retrieved by the retrieval part of similar documents and related documents 142 and performs weighting thereof. In the concept extraction processing by the extraction part of concept and relationship between concepts 143, a dictionary and a thesaurus are used. The concepts and relationships between concepts thus extracted and the weighting information are stored in the analysis result storage database 15.

As a method for recognizing the concepts, there are a method using a dictionary, an automatic recognition method such as C-value method (Maynard and Ananiadou, TKE, 212-221, 1999) and the like. Moreover, for extraction of the relationship between concepts, there are a statistical method using TF-IDF, Lnu-term weighting, HyperGsum or Mutual Information (log(N*df(x, y)/df(x)df(y)), in which df(x, y) indicates the number of documents including x and y), a method using syntactic analysis, and the like. Any of the above methods may be adopted. As to a method for collecting the related documents, references listed at the end of the document may be used or documents of which relevance to the document is pointed out somewhere in the document may be used. The similar documents may be retrieved by use of a similar document retrieval method using concepts or phrases that intensively and frequently appear in the document. Moreover, the concept recognition and extraction of relationships between concepts described above may be previously performed. Alternatively, a search may be carried out, only for a character string for which sufficient accuracy cannot be obtained in analysis of a figure, through a document having the figure described therein and a document similar or related to the document by using a probable concept that could be the character string as a query.

Regarding the document and the figure which have been preprocessed, the extraction part of figure information 3 extracts concepts and relationships between concepts in the figure in a form of having lexical ambiguity removed therefrom, by use of the preprocessed concepts and relationships between concepts, and an external thesaurus 2. For the above processing, firstly, characters in the figure are recognized. To be more specific, in Step 4 in FIG. 3, first, a figure of a gray image is binarized by image processing. For binarization, various methods can be used. To put it briefly, when f(x, y) is assumed to be a density at the coordinates (x, y), the image is converted into binary values g(x, y) based on whether or not f(x, y) is equal to or more than a threshold t.

$$g(x, y) = \begin{Bmatrix} 1 & f(x, y) \geq t \\ 0 & f(x, y) < t \end{Bmatrix}$$

As to a value of the threshold t, there are methods for determining the threshold t by performing correction using a density histogram of the entire image or a local region, by previously dividing a screen into several parts, and the like. Moreover, for a color image, the threshold is specified by use of brightness and a color difference.

After the image is binarized in Step 4 in FIG. 3, all of four-connected (four directions) or eight-connected (eight directions) pixels (connected components) are extracted (Step 5) and separated into characters and others (Step 6). Thereafter, a character string is extracted based on a distance between the connected components or the like, and an interpretation is made on whether or not the character string stands as a concept. This interpretation is made by use of concept candidates prepared by the preprocessing, the dictionary and the thesaurus. If lexical ambiguity remains in the spelling, estimation is made from the weight of the corresponding concept in the document (Step 7). Subsequently, among the connected components, those showing a relationship between concepts are selected to recognize the relationship between concepts (Step 8). In this step, shapes of the connected components are utilized. The shapes of the connected components include a shape of an end of a line connecting concepts, a direction of the line connecting concepts if the line is an arrow, whether the line is a solid line or a broken line, and the like. According to need, a figure title representing a leading concept of the figure, and concepts and relationships between concepts are associated with each other (Step 9). The extracted concepts and relationships between concepts are stored in the analysis result storage database 15 (Step 10).

Figure 4A:
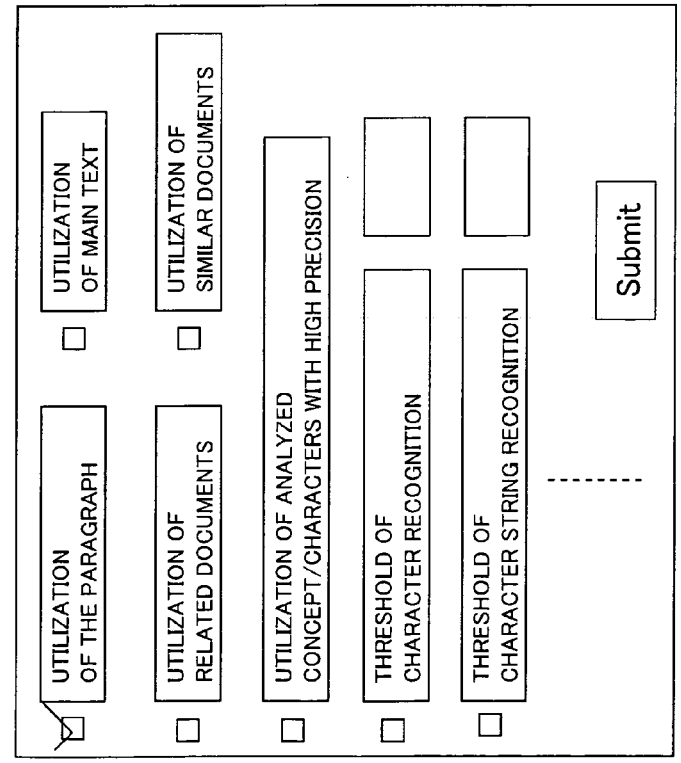
FIG. 4A is a view showing a screen example of an analysis condition input part and FIG. 4B is a view showing a screen example of a display part of analysis result.

The analyzed figure and the extracted data can be confirmed on the display part of analysis result 5. FIG. 4A shows an example of an analysis condition input screen. In this example, it is possible to set, at the time of removing the lexical ambiguity (specifying meanings of concepts having different meanings with the same spelling) in Step 7 in FIG. 3, whether to utilize the text of the paragraph in the main text referring to the figure, whether to utilize the main text, whether to utilize the related document or similar document, and whether to utilize the concepts in the figure analyzed with high precision. If any of those described above is to be utilized, an item to be utilized is checked. Moreover, thresholds for character recognition and character string recognition in the figure, and the like are also set. The extraction part of text information 14 and the extraction part of figure information 3 extract information from the text and the figure in the document according to the condition specified on the input screen.

Figure 4B:
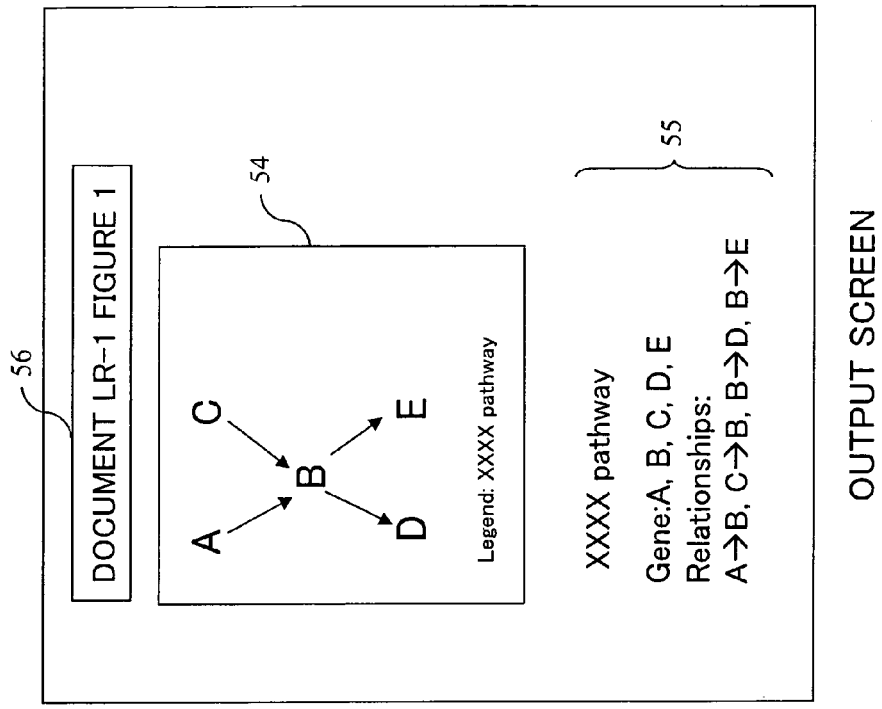

FIG. 4B shows an example of an output screen of the display part of analysis result 5. On the output screen of the display part of analysis result 5, a FIG. 54 to be analyzed and an analysis result 55 are displayed together with the figure number of the analyzed figure and a document number 56 of a document containing the figure. In this example, as a result of analysis of FIG. 1 (54) in the document LR-1, "XXXX pathway" is extracted as a concept representing contents of the figure. Moreover, as concepts in the figure, five concepts A, B, C, D and E representing genes are extracted, and as relationships between concepts, relationships A→B, C→B, B→D and B→E are extracted.

Figure 5B:
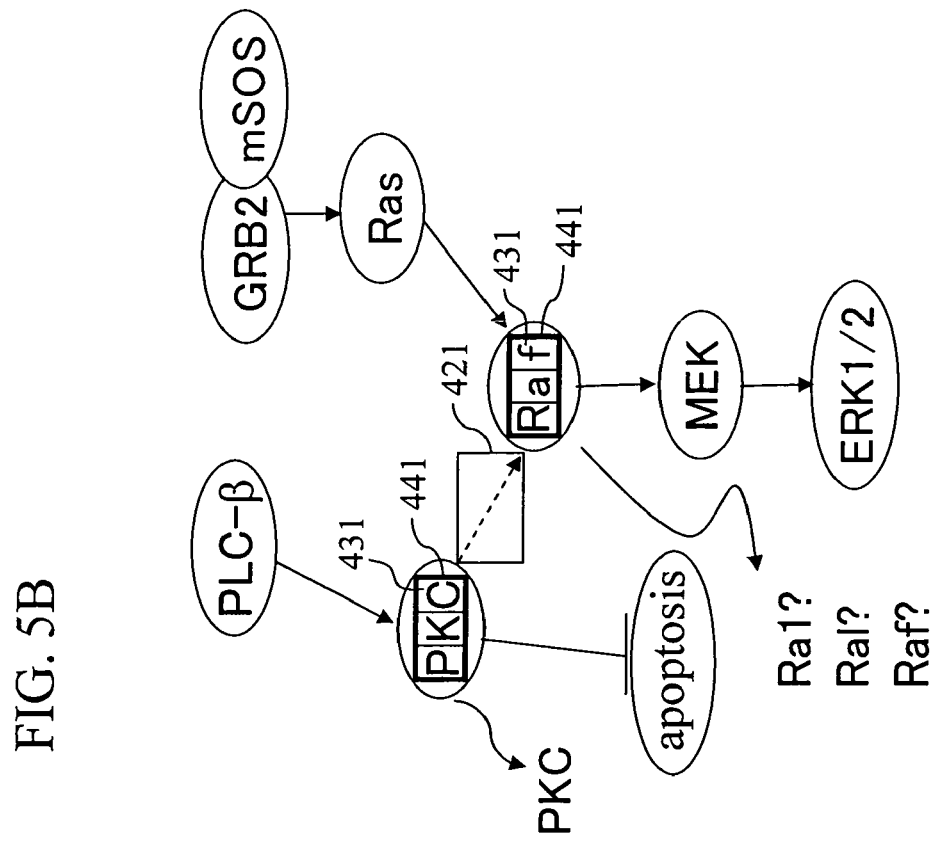
FIGS. 5A and 5B are views showing an example of analysis of concepts in a figure.
Figure 5A:
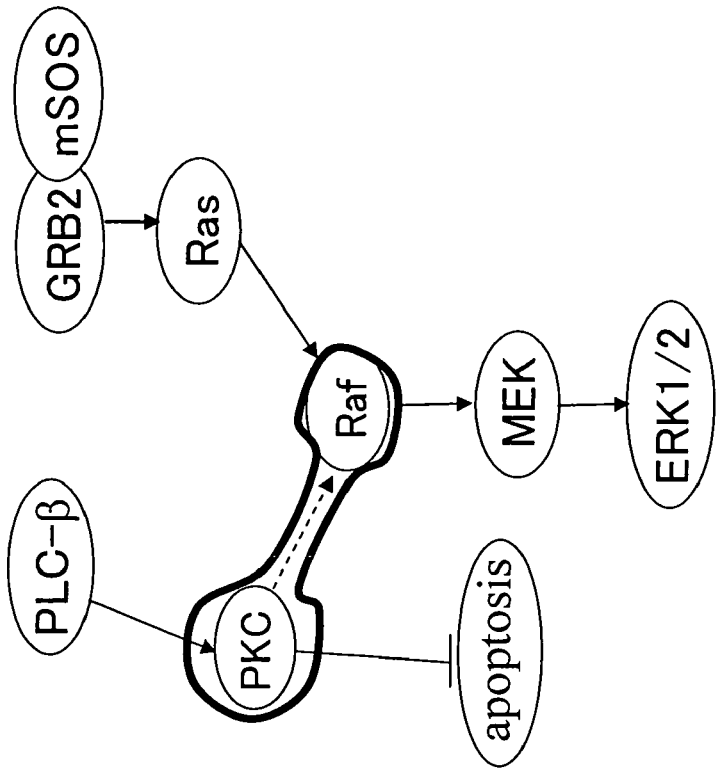

FIG. 5A schematically shows an example of the processing in Step 6 and Step 7 in FIG. 3. FIG. 5B shows an example of processing of only the portion surrounded by the heavy line in FIG. 5A. In FIG. 5B, reference numeral 421 denotes an example of an extracted connected component, reference numeral 431 denotes an example of a recognized character and reference numeral 441 denotes an example of a character string recognized as a concept.

In this example, respective characters P, K and C are extracted as connected components. Moreover, respective characters R, a and f are also extracted as connected components. Based on distances between the connected components, PKC and Raf are recognized as portions equivalent to concepts. In this example, while PKC is correctly recognized as PKC, Raf cannot be distinguished among Ral, Ral and Raf. When the thesaurus is used, the above three candidates are narrowed down to Ral and Raf. Furthermore, since the concept may not be registered in the thesaurus, spellings of Ral, Ral and Raf as well as synonyms thereof are also retrieved from information on the title and caption of the figure, and from the corresponding portions in the main text. As a result, Raf, Ral, Ral and the synonyms thereof do not exist in the main text and the concept cannot be determined to be any of those candidates only by referring to the main text. However, relationships PKC→RaX, Ras→RaX and RaX→MEK ("X" is a character that cannot be identified) between genes represented in the figure are utilized to limit gene candidates for RaX=by limiting the relationships to those occurring in this document and in a reference of this document or in a document similar thereto. Thus, RaX is determined to be Raf.

Figure 6C:
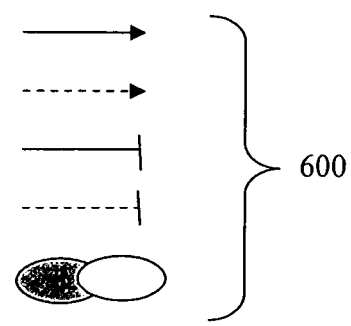
FIG. 6C is a table showing types of the relationships between concepts.

To be more specific, tables shown in FIGS. 6A to 6C are used to carry out a search for those having interactions with PKC, Ras and MEK and any of the names RaX: X=1, l and f. FIG. 6A is a table showing relationships between concepts and frequencies of occurrences of those relationships in the main text. The occurrence frequency here may be obtained by use of only the paragraph referring to the figure, only several paragraphs before and after the paragraph referring to the figure or similar documents and related documents. FIG. 6B is a table showing relationships between concept IDs and concepts. As to Symbol and full name, there may be a meaning class that defines those name types and also a meaning class that does not define those name types. When the dictionary and thesaurus 2 exist, FIG. 6 B shows subclasses. On the other hand, when the dictionary and thesaurus 2 do not exist, gene IDs are automatically given. FIG. 6C is a table showing types of relationships between two concepts. Symbols on the right represent symbols in the figure corresponding to the respective relationship types. Moreover, directions and kinds of arrows are extracted from information such as a ratio between starting and end points of an area of connected components or a directional property (either an activate type or an inhibit type).

FIGS. 7A and 7B are tables showing, as a result of analysis of FIGS. 5A and 5B, concepts and relationships between concepts which appear in FIGS. 5A and 5B. FIG. 7A is a table showing the relationships between concepts and FIG. 7B is a table showing relationships between the concepts and the figure in which the concepts appear. Since the figure described above shows a signal transmission system, gene IDs are given by removing ambiguity as to which gene. In this example, a name itself has no ambiguity, in other words, there are no concepts belonging to different IDs with the same spelling. Thus, an ambiguity removal step is not required. The information shown in FIGS. 7A and 7B is stored in the analysis result storage database 15.

FIG. 8 shows an example of a figure processed by the preprocessing part according to the present invention. In the example shown in FIG. 8, NIK is a synonym for two gene names MAP3K14 and MAP4K4. Accordingly, a specification is made on which one the name of the gene is, by utilizing a paragraph referring to the figure and a main text mainly before the paragraph. In the case of such abbreviations, full-names and abbreviations are often described in pairs. Thus, description of a pair including NIK and a spelling that may be a full-name thereof are searched instead of weighting the concept. In this case, NIK: NFκB-inducing kinase is described in a figure caption. Since NFκB-inducing kinase is a synonym for MAP3K14, NIK is determined to be MAP3K14. Since other gene names have no ambiguity, unique determination is made. The thesaurus 2 is used to check whether or not the concepts are synonyms. The information shown in FIG. 8 is simultaneously stored in the analysis result storage database 15. FIGS. 9A to 9D show an example. FIG. 9A shows relationships, FIG. 9B shows the concepts that have appeared and FIG. 9C shows the types of the relationships. FIG. 9D shows subclasses of the dictionary/thesaurus 2. When there is a thesaurus for a concept corresponding to a title, the thesaurus is used. When there is no thesaurus, Tagger is used to give word classes such as Schematic/adjective, drawing/noun, of/preposition, NE-induced/adjective, IL-8/noun, signal/noun, transduction/noun, pathway/noun, in/preposition and human/noun. Accordingly, concepts may be extracted by use of a method for extracting a noun phrase (in this case, connecting the noun or adjective word before pathway to after the preposition). Moreover, a pattern such as 'Fig. XX represents YY' may be used or a concept to be an object of Fig. XX may be extracted by performing syntactic analysis.

Figure 10:
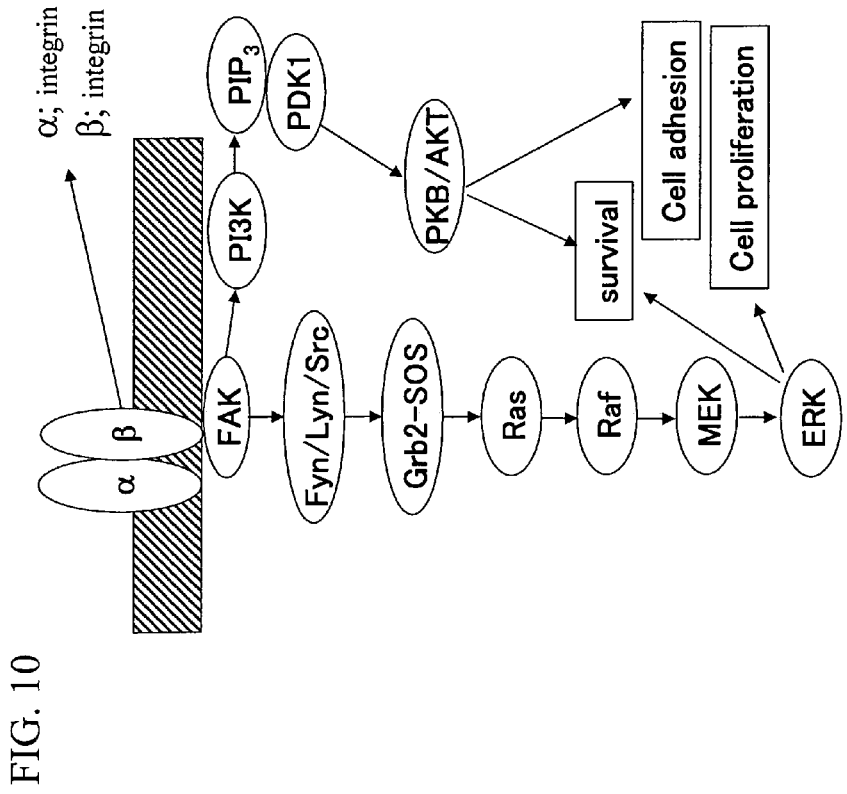
FIG. 10 is a view showing an example of a figure to be analyzed.

FIG. 10 shows another example of a figure processed by the preprocessing part according to the present invention. In the example shown in FIG. 10, gene names in the figure are partially omitted. Thus, specification of which one of the genes cannot be performed only on the basis of α and β. Moreover, α and β cannot be specified from Figure legends. However, the description "integrins heterodimers composed of α and β subunits" in the main text before the part referring to the figure reveals that α and β are integrins. Moreover, a title reveals that a control relationship between genes corresponding to this figure is ERK and PKB signaling pathway. From FIG. 10, relationships as shown in FIG. 11A are extracted. FIG. 11A shows the relationships, FIG. 11B shows the concepts that have appeared, FIG. 11C shows the types of the relationships and FIG. 11D shows a subset of the dictionary/thesaurus 2.

Figure 12:
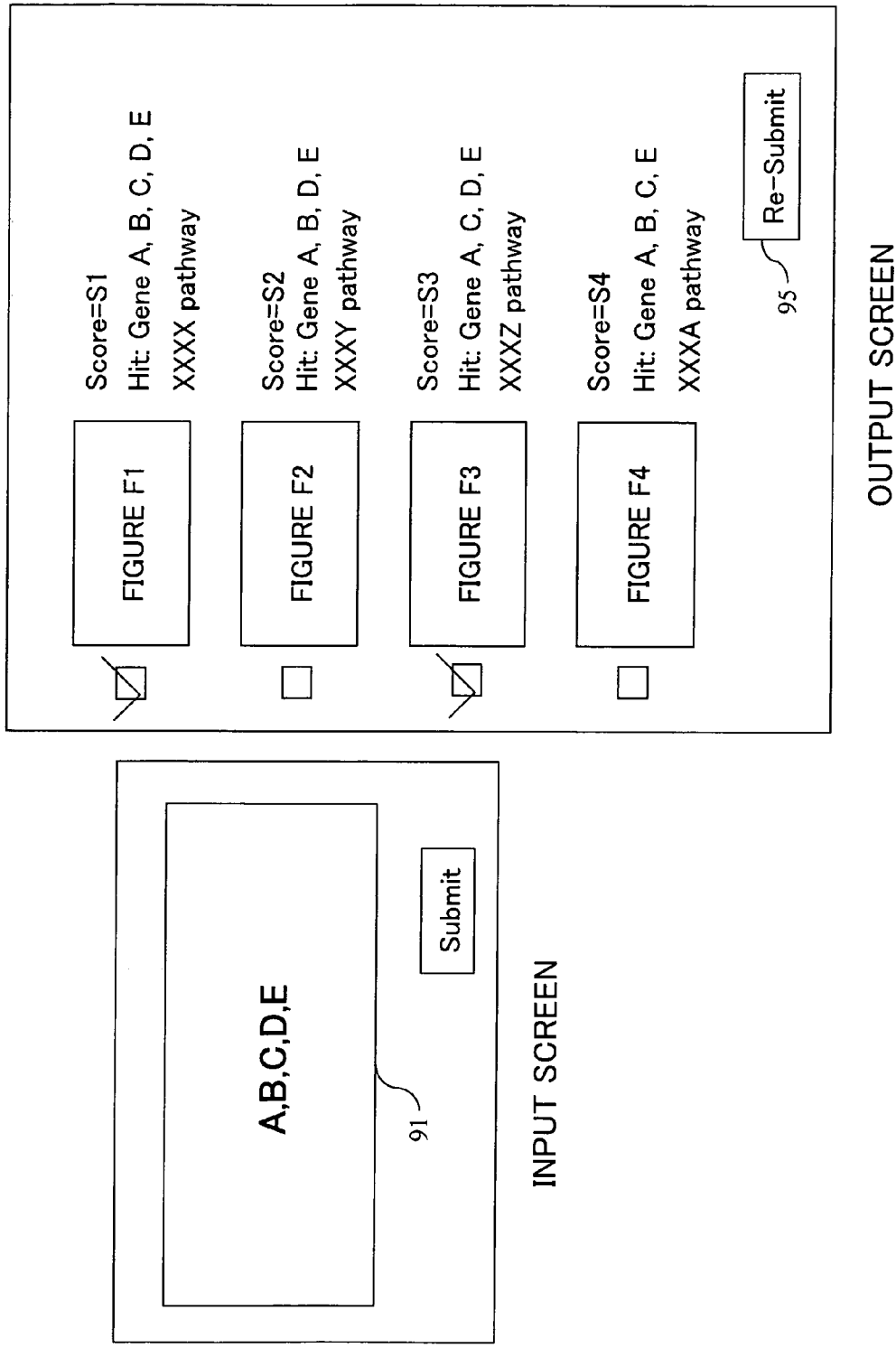
FIG. 12 is a view showing an example of retrieval of the analyzed figure.

FIG. 12 shows an example of a display screen in a system for extracting gene names and control relationships between genes from figures in a document as described above and searching through the figures having those concepts and relationships between concepts attached thereto as indices. The figures are ranked and displayed in descending order of relevance to gene groups A to E inputted as a retrieval key to an input part 91 of an input screen by a user. Next to each of the displayed figures, concepts extracted from the figure and a concept representing the entire figure are displayed. A concept corresponding to XXXX pathway is one extracted from a figure title or a figure caption.

It is possible to adopt various methods for ranking. For example, when there are L overlaps for n queries among M genes in the figure, the total number of genes is set to K (for example, about 25,000 in the case of Homo sapiens). As a result, a hypergeometric distribution is obtained and a probability density distribution p(L) is expressed by the following equation.

$$p(L) = \frac{{}_M C_L \cdot {}_{K-M} C_{n-L}}{{}_K C_n}, \quad {}_M C_L = \frac{L!(M-L)!}{M!} \quad (1)$$

Here, the smaller the value of p(L), the more deeply the figure is related to the query.

FIGS. 11A to 11D show a data structure utilized in FIG. 10. In FIG. 10, queries are A to E. If the relationships are also wished to be included in the queries, a table concerning the relationships as shown in FIG. 6A is also required.

Moreover, as shown in FIG. 12, by selecting some of the figures displayed on the output screen and pressing a Re-Submit button 95, figures similar to the selected figures can also be retrieved. FIGS. 13A and 13B show data to be utilized. FIG. 13A is a table storing concepts and figures related to the concepts. FIG. 13B is a table storing figure names and information about positions of the figures in the document. In the example shown in FIG. 12, the figures are selected as queries by checking the check boxes displayed next to the figures.

As a retrieval algorithm in this event, concepts and relationships between concepts appearing in the figures selected as the queries are utilized and the figure having high relevance is selected by the same scoring as that described above. As to the concepts that appear repeatedly in the selected figure, high weighting or the like may be performed at the time of the above calculation. Moreover, documents may be retrieved by utilizing the queries described above as those for normal document retrieval.

Figure 14:
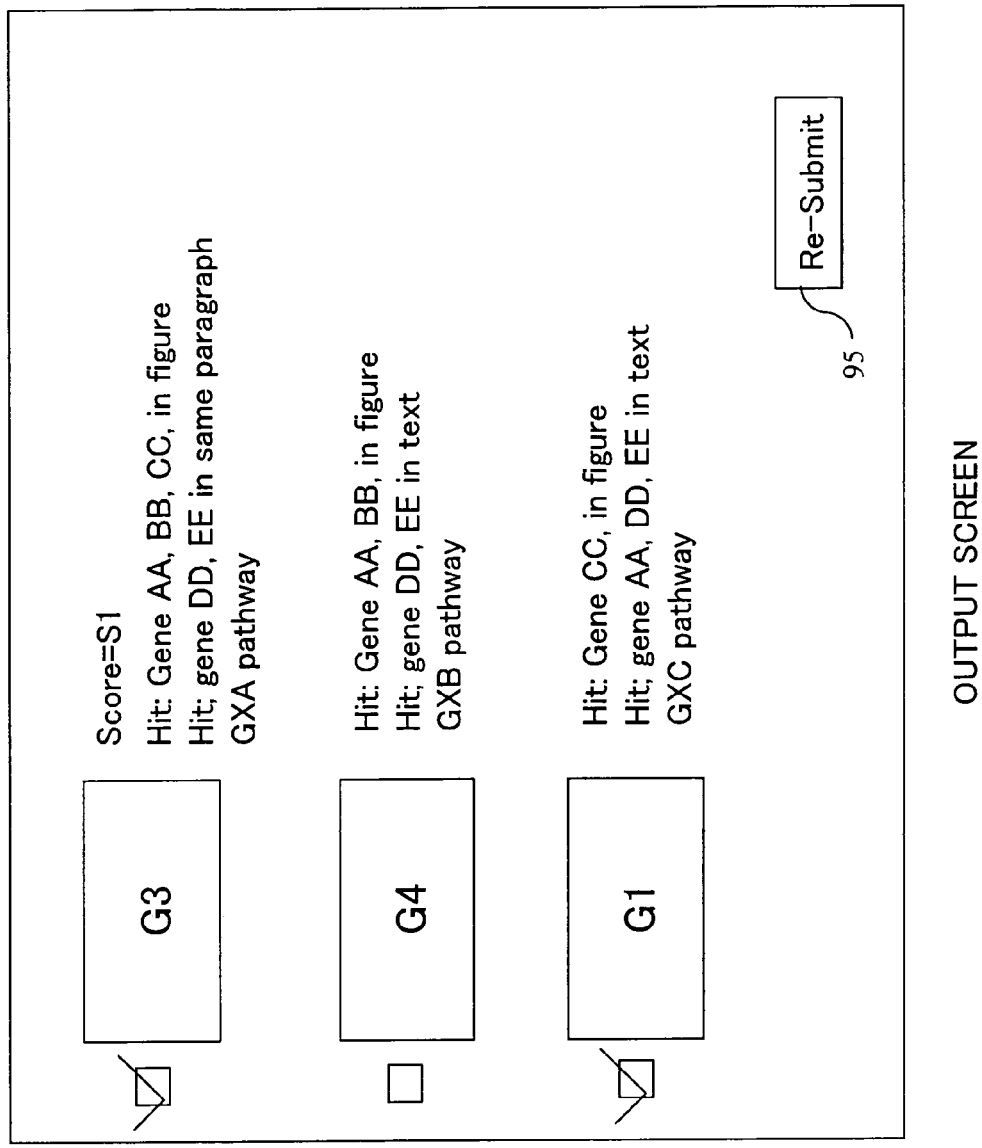
FIG. 14 is a view showing an example of retrieval of the analyzed figure.

FIG. 14 shows another example of an output screen in a system for extracting gene names and control relationships between genes from figures in a document as described above and searching through the figures having those concepts and relationships between concepts attached thereto as indices. In this example, the indices utilized for retrieval include not only the concepts in the figures but also a main text, similar documents and related documents. FIGS. 15A and 15B show data to be utilized. FIG. 15A is a table storing concepts, figures related to the concepts and appearance locations of the concepts. FIG. 15B is a table storing figure names and information about positions of the figures in the document. Among the appearance locations shown in FIG. 15A, f represents within the figure, p represents within the same paragraph, and t represents within the main text. For example, when there are a series of signaling pathways such as AA activates BB, BB activates CC, CC regulates DD and DD regulates EE, assume that the pathways within the range of AA, BB and CC are called a GXA pathway and there is no collective term for all of AA, BB, CC and DD. Here, since in the main text, there are many descriptions of gene names concerning the GXA pathway such as "the GXA pathway controls DD and EE", a figure that can explain a relation between the GXA pathway and DD and EE, and also a text referring to the figure can be retrieved when the queries are AA, BB, CC, DD and EE. The concepts representing AA to EE may be the gene names or other concepts including those representing functions such as apoptosis and cell death.

Weighting in score calculation is changed according to differences in the appearance locations of the concepts. For example, in the equation (1), by counting one gene as 3, f may be counted as 3, p may be counted as 2 and t may be counted as 1. For example, although retrieval keys in the queries shown in FIG. 14 are AA, BB, CC, DD and EE, n=15 is set instead of n=5. Accordingly, in G3, M=5*3 and L=3*3+2*2=13 are established. In this example, as in the case of the example shown in FIG. 10, similar figures and documents can also be retrieved by selecting the figures from the output result.

The present invention enables construction of a mining system for extracting information from figures in a document containing the figures and for utilizing the information for retrieval.

What is claimed is:

1. A data mining system comprising:
    an extraction part of figure information which performs image processing on a figure in a document and extracts information on concepts and relationships between the concepts in the figure;
    an extraction part of text information which extracts information on concepts and relationships between the concepts from a text portion in the document; and
    a storing part which stores, in association with each other, images in the figure, identification information of the figure, and the information on the concepts and the relationships between the concepts in the figure, which is extracted by the extraction part of figure information,
    wherein the extraction part of figure information extracts the information on the concepts and/or the relationships between the concepts in the figure by utilizing the information extracted by the extraction part of text information, wherein
    the extraction part of text information has a function of retrieving a paragraph referring to the figure from the document and
    the extraction part of figure information extracts a concept that cannot be specified due to insufficient accuracy of the image processing, and a concept having lexical ambiguity, by utilizing the information on concepts or the information the concepts and the relationships between the concepts, which is extracted from the paragraph extracted by the extraction part of text information.

2. The data mining system according to claim 1, wherein the extraction part of figure information extracts a concept that cannot be specified due to insufficient accuracy of the image processing, and a concept having lexical ambiguity, by utilizing the information on concepts in the document or the information on the concepts and the relationships between the concepts, which is extracted by the extraction part of text information.

3. The data mining system according to claim 1, wherein the extraction part of figure information extracts characters in the figure by performing image processing on the figure, extracts a concept composed of a plurality of consecutive characters by considering the distances between adjacent characters, and extracts a relationship between concepts based on a shape of a symbol disposed between the concepts.

4. A data mining system comprising:
an extraction part of figure information which performs image processing on a figure in a document and extracts information on concepts and relationships between the concepts in the figure;
an extraction part of text information which extracts information on concepts and relationships between the concepts from a text portion in the document; and
a storing part which stores, in association with each other, images in the figure, identification information of the figure, and the information on the concepts and the relationships between the concepts in the figure, which is extracted by the extraction part of figure information,
wherein the extraction part of figure information extracts the information on the concepts and/or the relationships between the concepts in the figure by utilizing the information extracted by the extraction part of text information, wherein
the extraction part of text information has a function of retrieving documents related and/or similar to the document including the figure from a document database and
the extraction part of figure information extracts a concept that cannot be specified due to insufficient accuracy of the image processing, and a concept having lexical ambiguity, by utilizing the information on concepts or the information on the concepts and the relationships between the concepts, which is extracted from the related documents and/or similar documents retrieved by the extraction part of text information.

5. The data mining system according to claim 4, wherein the extraction part of figure information extracts a concept that cannot be specified due to insufficient accuracy of the image processing, and a concept having lexical ambiguity, by utilizing the information on concepts in the document or the information on the concepts and the relationships between the concepts, which is extracted by the extraction part of text information.

6. The data mining system according to claim 4, wherein the extraction part of figure information extracts characters in the figure by performing image processing on the figure, extracts a concept composed of a plurality of consecutive characters by considering the distances between adjacent characters, and extracts a relationship between concepts based on a shape of a symbol disposed between the concepts.

7. A data mining system comprising:
an extraction part of figure information which performs image processing on a figure in a document and extracts information on concepts and relationships between the concepts in the figure;
an extraction part of text information which extracts information on concepts and relationships between the concepts from a text portion in the document; and
a storing part which stores, in association with each other, images in the figure, identification information of the figure, and the information on the concepts and the relationships between the concepts in the figure, which is extracted by the extraction part of figure information,
wherein the extraction part of figure information extracts the information on the concepts and/or the relationships between the concepts in the figure by utilizing the information extracted by the extraction part of text information, wherein
the extraction part of text information extracts, from a title, a caption or a main text of the figure, a concept representing a content of the figure by use of a dictionary, a unique expression recognition method, an extraction pattern or syntactic analysis, and then stores the extracted concepts in the storing part, in association with identification information of the figure.

8. The data mining system according to claim 7, wherein the extraction part of figure information extracts a concept that cannot be specified due to insufficient accuracy of the image processing, and a concept having lexical ambiguity, by utilizing the information on concepts in the document or the information on the concepts and the relationships between the concepts, which is extracted by the extraction part of text information.

9. The data mining system according to claim 7, wherein the extraction part of figure information extracts characters in the figure by performing image processing on the figure, extracts a concept composed of a plurality of consecutive characters by considering the distances between adjacent characters, and extracts a relationship between concepts based on a shape of a symbol disposed between the concepts.

10. A data mining method comprising:
a step of inputting a document including a figure to a processing part;
a text processing step of extracting information on concepts and relationships between the concepts from a text portion in the document in the processing part;
a figure processing step of extracting characters in the figure in the document by performing image processing on the figure, extracting a concept composed of a plurality of consecutive characters by considering the distances between adjacent characters, and extracting a relationship between concepts based on a shape of a symbol disposed between the concepts; and
an output step of outputting images in the figure, identification information of the figure and the information on the concepts and the relationships between the concepts in the figure, which is extracted in the figure processing step, in association with each other,
wherein, in the figure processing step, the information on the concepts and/or the relationships between the concepts in the figure is extracted by utilizing the information extracted in the text processing step, wherein
the text processing step includes a step of retrieving a paragraph referring to the figure from the document, and extracting information on concepts and relationships between the concepts from the paragraph, and
in the figure processing step, a concept that cannot be specified due to insufficient accuracy of the image processing and a concept having lexical ambiguity are extracted by utilizing the information on concepts or the information on the concepts and the relationships between the concepts, which is extracted from the paragraph.

11. The data mining method according to claim 10, wherein a concept that cannot be specified due to insufficient accuracy of the image processing in the figure processing step and a concept having lexical ambiguity are extracted by utilizing concepts in the document, which are extracted in the text processing step, or the information on the concepts and the relationships between the concepts.

12. A data mining method comprising:
a step of inputting a document including a figure to a processing part;
a text processing step of extracting information on concepts and relationships between the concepts from a text portion in the document in the processing part;
a figure processing step of extracting characters in the figure in the document by performing image processing on the figure, extracting a concept composed of a plurality of consecutive characters by considering the distances between adjacent characters, and extracting a relationship between concepts based on a shape of a symbol disposed between the concepts; and
an output step of outputting images in the figure, identification information of the figure and the information on the concepts and the relationships between the concepts in the figure, which is extracted in the figure processing step, in association with each other,
wherein, in the figure processing step, the information on the concepts and/or the relationships between the concepts in the figure is extracted by utilizing the information extracted in the text processing step, wherein
in the text processing step, a concept representing a content of the figure is extracted from any of a title, a caption of the figure and a main text, and
in the output step, a dictionary, a unique expression recognition method, an extraction pattern or syntactic analysis is used to output the concept representing the content of the figure in association with the identification information of the figure.

13. The data mining method according to claim 12, further comprising a step of retrieving a document related and/or similar to the document including the figure from a document database, wherein
in the text processing step, information on concepts and relationships between the concepts is extracted from a text portion of the retrieved related document and/or similar document.

14. A retrieval system comprising:
a database which stores an information comprising;
images in a figure included in a document, identification information of the figure and information on concepts and relationships between the concepts in the figure in association with each other
information on concepts and relationships between the concepts from a text portion in the document,
text information extracts, from a title, a caption or a main text of the figure, a concept representing a content of the figure by use of a dictionary, a unique expression recognition method, an extraction pattern or syntactic analysis, and then stores the extracted concepts in the storing part, in association with identification information of the figure;
an input part which inputs retrieval concepts;
a retrieval part which calculates relevance between the retrieval concepts inputted by the input part and concepts in the figure, which are associated with the figure and stored in the database, and outputs the images in the figure by ranking the images in terms of the relevance; and
a display part which displays the images in the figure in descending order of relevance, the images outputted from the retrieval part.

15. The retrieval system according to claim 14, wherein the display part displays scores of the relevance to the figure and the concepts associated with the figure together with the images in the figure, which are outputted from the retrieval part.

16. The retrieval system according to claim 15, wherein
the database stores a name of the figure in association with the figure and
the display part displays the name of the figure together with the image in the figure, which is outputted from the retrieval part.

17. The retrieval system according to claim 14, wherein
the database stores information on the concepts and relationships between the concepts included in a text portion of the document and
the retrieval part executes retrieval by treating the information on the concepts and the relationships between the concepts included in the text portion of the document the same as the information on the concepts and the relationships between the concepts in the figure.

18. The retrieval system according to claim 17, wherein
the display part displays the images in the figures in a selectable manner and
the retrieval part executes retrieval by using concepts associated with a selected figure as retrieval concepts.

19. The retrieval system according to claim 14, wherein
the display part displays the images in the figures in a selectable manner and
the retrieval part executes retrieval by using concepts associated with a selected figure as retrieval concepts.

* * * * *